United States Patent [19]
Topham et al.

[11] Patent Number: 4,637,328
[45] Date of Patent: Jan. 20, 1987

[54] NO-TILL PLANTER

[75] Inventors: Arnold. J. Topham, Booneville; Harry W. Wilson, Paris, both of Ark.

[73] Assignee: Dibbler, Inc., Booneville, Ark.

[21] Appl. No.: 634,278

[22] Filed: Jul. 25, 1984

[51] Int. Cl.$^4$ ................................................ A01C 5/00
[52] U.S. Cl. ..................................... 111/89; 221/265; 222/525
[58] Field of Search ........................ 111/89, 90, 92, 93, 111/94, 95, 96, 97, 98, 73, 80; 221/307, 266, 265, 264; 222/525, 523; 172/21, 22

[56] References Cited

U.S. PATENT DOCUMENTS

| | | | |
|---|---|---|---|
| 234,984 | 11/1880 | Hudson | 111/97 |
| 632,245 | 9/1899 | Coyim | 111/89 X |
| 1,041,613 | 10/1912 | Frederick | 111/92 |
| 1,792,763 | 2/1931 | Ryan | 111/50 X |
| 1,990,795 | 2/1935 | McKee | 111/73 X |
| 2,370,744 | 3/1945 | Molinare | 111/96 |
| 2,587,386 | 2/1952 | Rounds | 111/89 |
| 2,776,634 | 1/1957 | Morton | 111/92 |
| 3,414,063 | 12/1968 | Kuhlman | 172/21 |
| 3,773,224 | 11/1973 | Winslow | 111/80 X |
| 4,067,268 | 1/1978 | Lofgren et al. | 111/89 X |
| 4,291,819 | 9/1981 | Heller et al. | 221/264 X |
| 4,566,543 | 1/1986 | Kotani | 172/21 X |

FOREIGN PATENT DOCUMENTS

| | | | |
|---|---|---|---|
| 2854923 | 7/1979 | Fed. Rep. of Germany | 111/89 |
| 833488 | 11/1938 | France | 111/95 |
| 950108 | 9/1949 | France | 111/96 |

OTHER PUBLICATIONS

International Harvester Company, "International Agricultural Equipment Buyers Guide 1981," undated, p. 43, (part No. AD-33921-K).

Primary Examiner—James R. Feyrer
Assistant Examiner—Terrence L. B. Brown
Attorney, Agent, or Firm—Arnold, White & Durkee

[57] ABSTRACT

A mechanically operated no-till planting apparatus for repeatedly and successively penetrating the soil to a predetermined depth at a predetermined spacing, depositing a quantity of seed and/or adjacent thereto repeatedly, simultaneously and successively penetrating the soil to a predetermined depth at a predetermined spacing and depositing a quantity of fertilizer with the piercing and metering devices constructed of an outer member cooperatively operating with an inner member with the outer and inner members partially operating in unison and partially operating independently of each other to accomplish piercing of the soil, metering of seed and/or fertilizer and depositing the seed and/or fertilizer in the soil as the metering and piercing devices operate in the vertical plane with a sled and transporting device, the sled and transporting device moving in the horizontal plane.

27 Claims, 16 Drawing Figures

NO-TILL PLANTER

BACKGROUND OF THE INVENTION

A. Field of the Invention

This invention relates to a no-till planter to be used for planting seed and dispensing fertilizer without tilling the soil. The ability to plant seed and place fertilizer adjacent thereto, without tilling the soil has been hailed as a means of minimizing loss of moisture and erosion.

B. Background

Traditionally, the means for planting seed in large quantities has been by using large tractor pulled plows, tillers and other farm implements. These implements are pulled across the soil thereby breaking the upper crust of the top soil and breaking up any surface vegetation. As the seed planter is pulled across the tilled soil, seed is continuously placed in a row and covered where it is left to germinate. Later after the seed has germinated the plants and crops must be thinned out in order to give each plant an opportunity to form an adequate root system. Manual thinning of plants is a labor intensive procedure.

Additionally, tilling of the soil can result in propagation of unwanted weeds, particularly those weeds propagated by rhizomes. During the tilling operation the rhizomes are cut up by the farm implements thereby resulting in the propagation of additional weed plants. While no-till planting has been recognized by many, no suitable tractor pulled planter is available.

Seed planters and fertilizer applicators are known in the art. However, most of these devices require a series of hand and foot manuevers in order to accomplish piercing of the soil and metering of the seed or fertilizer. While these devices may prove to be useful to a hobbyist planting a small garden patch they are totally inappropriate for large scale planting and large scale farming.

An example of a prior mechanical implement for depositing seed or fertilizer is shown in U.S. Pat. No. 1,477,097 to F. J. Anderson et al. However this implement exhibits shortcomings in its operation. One particular shortcoming of the mechanical implement disclosed by Anderson et al. is the clogging of the dispensing device as it enters the soil. This clogging is caused by an open, unobstructed orifice being used as part of the piercing mechanism.

SUMMARY OF THE INVENTION

It is a general objective of the present invention to provide a farm implement and a method for simultaneously piercing the soil and metering material to be imbedded in the soil by repeatedly and successively penetrating the soil to a predetermined depth at a predetermined spacing depositing a quantity of seed and simultaneously and adjacent thereto simultaneously, repeatedly and successively penetrating the soil to a predetermined depth at a predetermined spacing and depositing a quantity of fertilizer.

The farm implement consists of a support means, a means for moving the support means horizontally across the soil, inner and outer members carried by the support means for piercing holes in the soil with the outer member being tubular in shape and having an open end formed by frustoconical end portion. The inner member fitting within the outer member is sized to conform to the general configuration of the outer member and terminates in a generally cone shaped lower end which facilitates the insertion of both the inner and outer members in the soil. The cone shaped lower end and the frustoconical end portion of the inner and outer members form a dispensing chamber when in inner engagement with each other.

It is a further object to this invention to construct the inner and outer chambers in a method which minimizes the possible plugging of the dispensing chamber as the soil is pierced. A metering system is mounted internally of the inner and outer members and positioned above the dispensing chamber for taking and metering seed and/or fertilizer from a storage chamber mounted above the metering chamber and depositing said metered seed and/or fertilizer in the internal dispensing chamber. The apparatus also includes a means for supplying seed and/or fertilizer to the storage chamber or compartment located above the metering system.

Additionally a motive means is furnished for downwardly moving the inner and outer members together with the lower ends thereof in engagement for piercing a hole in the soil. Additionally by moving the inner member upward relative to the outer member while the outer member is in the soil enables the dispensing of seeds and/or fertilizer from the dispensing chamber into the hole formed by the inner and outer members piercing the soil in unison. By moving the inner member upward relative to the outer member the metering device is enabled and readied for a subsequent cycle. By moving the inner member relative to the outer member in the downstroke to reestablish engagement between the cone shaped lower end portion of the inner member and the frustoconical lower end of the outer member the metering device deposits seed and/or fertilizer in the dispensing chamber in preparation for the next piercing step.

Additionally a means for pivoting the inner and outer members about a transverse horizontal axis essentially perpendicular to the axis of the movement of the support member is provided so that the inner and outer members pierce holes in the soil as the support member moves horizontally over the soil.

To further aid the horizontal movement of the support means a sled is provided at the bottom of the piercing apparatus, the sled provided with upward curving surfaces to permit a smooth travel over clods of soil and uneven turf. The sled is further provided with a slot in the bottom thereof to permit penetration of the piercing members through the sled surface.

Additionally the sled is adjustable in the vertical plane without affecting the pivoting of the sled to permit adjustment of the piercing depth of the piercing members. The sled is further provided with a rotational point about a drive shaft to permit the sled to absorb vertical forces by translating the vertical forces to rotational forces.

Accordingly, the present invention offers the following advantages.

1. erosion is reduced since the soil is not tilled;
2. lower seed and fertilizer costs may be realized since the fertilizer and seed are placed at a predetermined space rather than dropping seed in a continuous manner in a furrow;
3. closer rows can be achieved since one is not limited by the large dimensions of plows and tillers;
4. a substantial energy savings, lower fuel costs and lower tractor costs may be realized since the higher horsepower tractors can be avoided since tilling is not required;
5. conservation of moisture, since the soil is not tilled the surface area does not tend to dry out as quickly;
6. Reduction in fertilizer cost, since the fertilizer is accurately placed in relation to the seed location, no fertilizer is wasted by improper application;
7. no crop thinning is required since the seed is accurately placed at a predetermined location and at a predetermined spacing.
8. ability to plant in fields with stubble, mulch or other crops without tilling and therefore minimizing erosion and loss of moisture by retaining an overburden of material.

BRIEF DESCRIPTION OF THE DRAWINGS

The nature and advantages of the invention will become more apparent upon reading the following detailed description of the invention with reference to the drawings in which.

DESCRIPTION OF THE PREFERRED EMBODIMENT

The preferred embodiment will be described as a device for repeatedly and successively penetrating the soil to a predetermined depth at a predetermined spacing and depositing a quantity of seed and adjacent thereto repeatedly and successively penetrating the soil to a predetermined depth at a predetermined spacing and depositing a quantity of fertilizer.

It is to be understood, however, that the description is not to be read in a limiting sense and that the device described may be used to either place seed without the placement of fertilizer, or place fertilizer without the placement of seed, or to place fertilizer and seed simultaneously.

The preferred embodiment includes a device comprised of two piercing and metering tubes which again is not be read in a limiting sense. It is to be understood that the no-till planter may be utilized in a single or tandem combination or any other combination which can be accommodated on a trailer or transporting device. Additionally, it is to be understood that multiple rows may be planted simultaneously by utilizing single or dual no-till planters at varying spacings.

Figure 1:
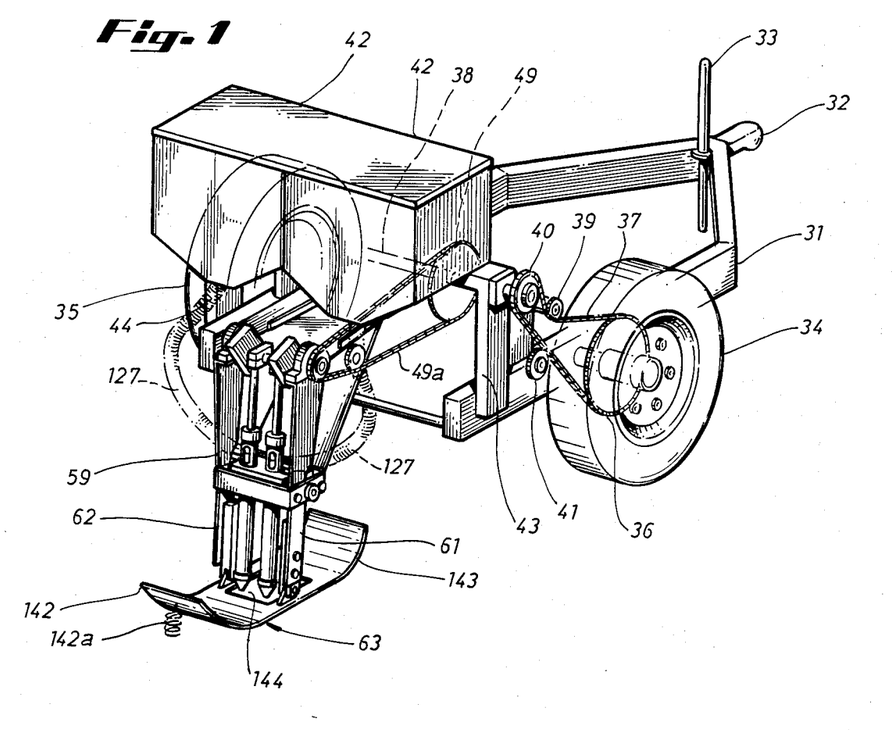
FIG. 1 is a perspective view of the no-till planter showing the device for transporting the planter, the drive train, hoppers and a dual piercing and metering device.

Referring to FIG. 1 a transporting device is depicted as including a trailer 31, a trailer hitch 32 commonly known in the art and a trailer stand 33 which is used to support the hitch of the trailer when the planting device is not used. The planter trailer is supported and transported by two tires 34 and 35. It is to be understood that while pneumatic tires are illustrated any type of tires may be utilized.

As the tire 34 is turned, drive gear 36 which is mounted on the drive shaft for tire 34 is also turned. As drive gear 36 turns, drive chain 37 turns about the outer circumference of drive gear 36. It is to be understood that while the preferred embodiment illustrated in FIG. 1, utilizes a drive chain 37; a V-belt commonly known in the art may also be utilized. The drive chain 37 drives the planter drive shaft 38 by driving the drive shaft drive gear 39. In order to maintain proper tension in the drive chain 37, two idler gears are utilized, a stationary idler gear 40 and an adjustable idler gear 41. The planter trailer 31 further supports two hoppers 42. In the preferred embodiment one is a fertilizer hopper and the second is a seed hopper.

Figure 2:
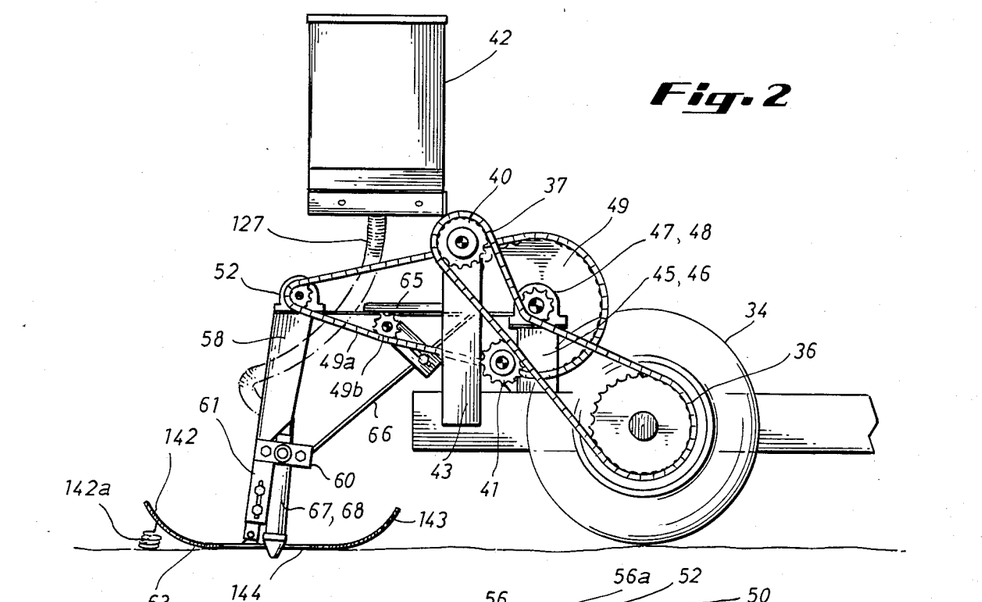
FIG. 2 is a side elevational view of the no-till planter depicted in FIG. 1.

Referring to FIGS. 1 and 2, vertical support members 43 and a horizontal support member 44 are utilized to support the hoppers 42. Additionally, vertical support member 43 supports stationary idler gear 40. The planter drive shaft 38 is supported by vertical members 45 and 46 on opposite sides of the trailer 31. Vertical members 45 and 46 support pillow block bearings 47 and 48.

Drive shaft 38 spans pillow block bearings 47 and 48. It is to be understood that the drive shaft outer diameter is properly sized to conform to the inner diameter of pillow block bearings 47 and 48.

Referring to FIGS. 1 and 2, a camshaft drive gear 49 is mounted on the drive shaft 38 between pillow block bearings 47 and 48. It is to be understood from the foregoing description that the camshaft drive gear 49 rotates at a rate proportional to the rotation of tire 34 depending on the ratios of the gear members between tire 34 and the drive shaft drive gear 39 as the trailer is pulled through the area to be planted.

Figure 4:
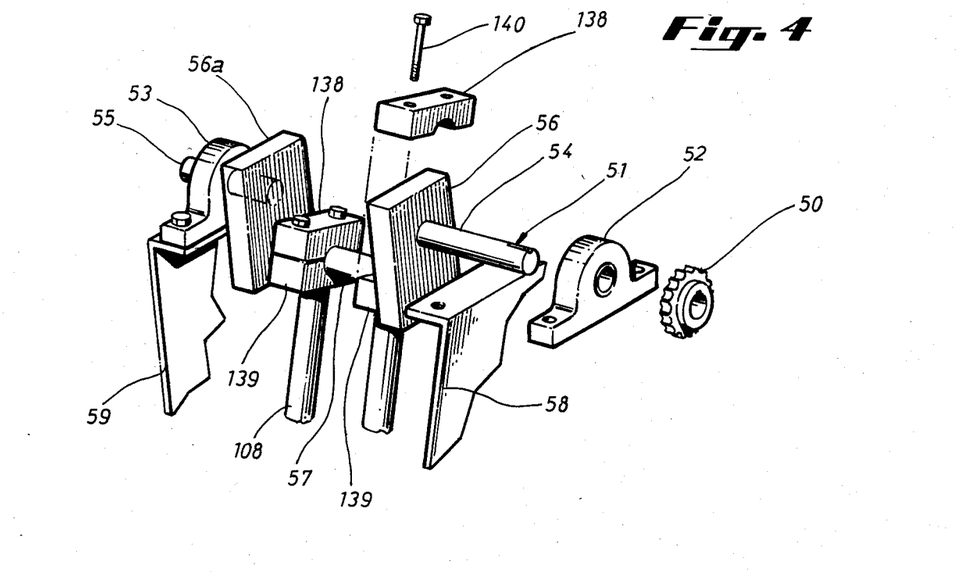
FIG. 4 is an exploded view of the camshaft and connecting rods.

Referring to FIGS. 1 and 4 camshaft drive gear 49 turns a chain 49a which turns a camshaft gear 50 mounted on the camshaft major axis 51. Tension of chain 49a is adjusted by adjustable idler 49b. The camshaft major axis 51 is illustrated in FIG. 4 and supported by camshaft major axis pillow block bearings 52 and 53. The pillow block bearings 52 and 53 are mounted on the guide tube frame vertical support members 58 and 59. The camshaft major axis is made up of two shaft stubs 54 and 55 which span from the pillow block bearings 52 and 53 respectively to the connection blocks 56 and 56a. The connection block 56 spans from the major shaft stub 54 to the camshaft minor axis shaft 57. In a similar fashion the connection block 56a spans from the major axis shaft stub 55 to the camshaft minor axis shaft 57.

Rotation of the camshaft major axis shaft stub 54 results in an eccentric rotation of the camshaft minor axis shaft 57.

To minimize vibration of the camshaft minor axis shaft 57 and camshaft major axis 51, counterweights may be applied to camshaft major axis shaft stubs 54 and 55 on the outboard ends. Application of these counterweights tends to offset the lopsided inertial action caused by a mass applied to one side of a rotating shaft.

Figure 3:
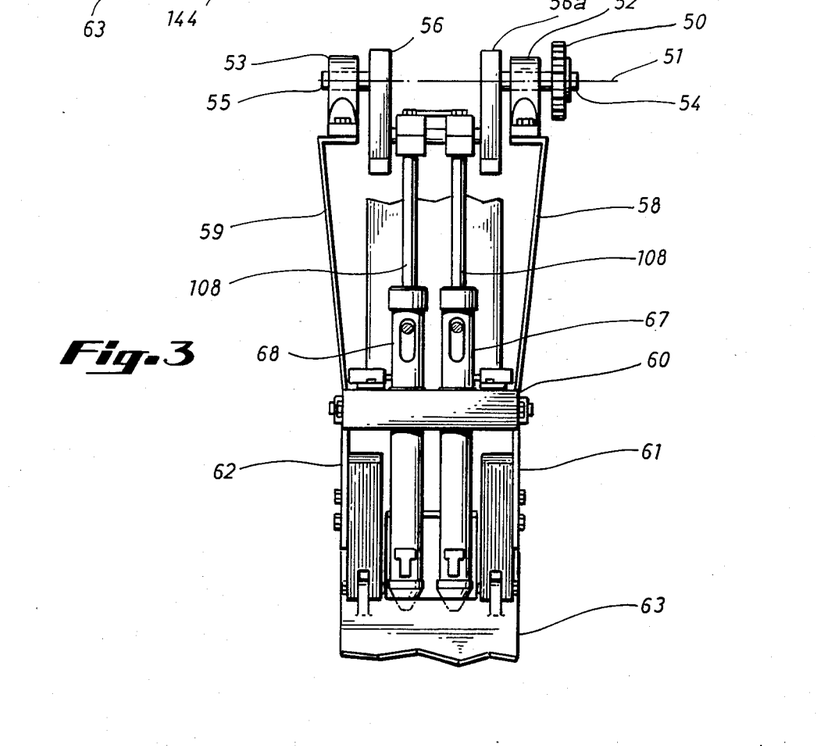
FIG. 3 is a rear elevational view of the dual piercing and metering device.

Referring to FIG. 3 the guide tube frame vertical support members 58 and 59 are rigidly attached to a guide tube saddle 60, which is rigidly attached to sled vertical support members 61 and 62. The sled 63 is attached to sled vertical support members 61 and 62 at pivot point 64. Pivot point 64 may be adjusted in the vertical plane thus permitting the vertical dimension between sled 63 and the guide tube saddle 60 to be adjusted. This will accommodate the vertical positioning of the members which pierce the soil, as later described in greater detail.

Figure 5:
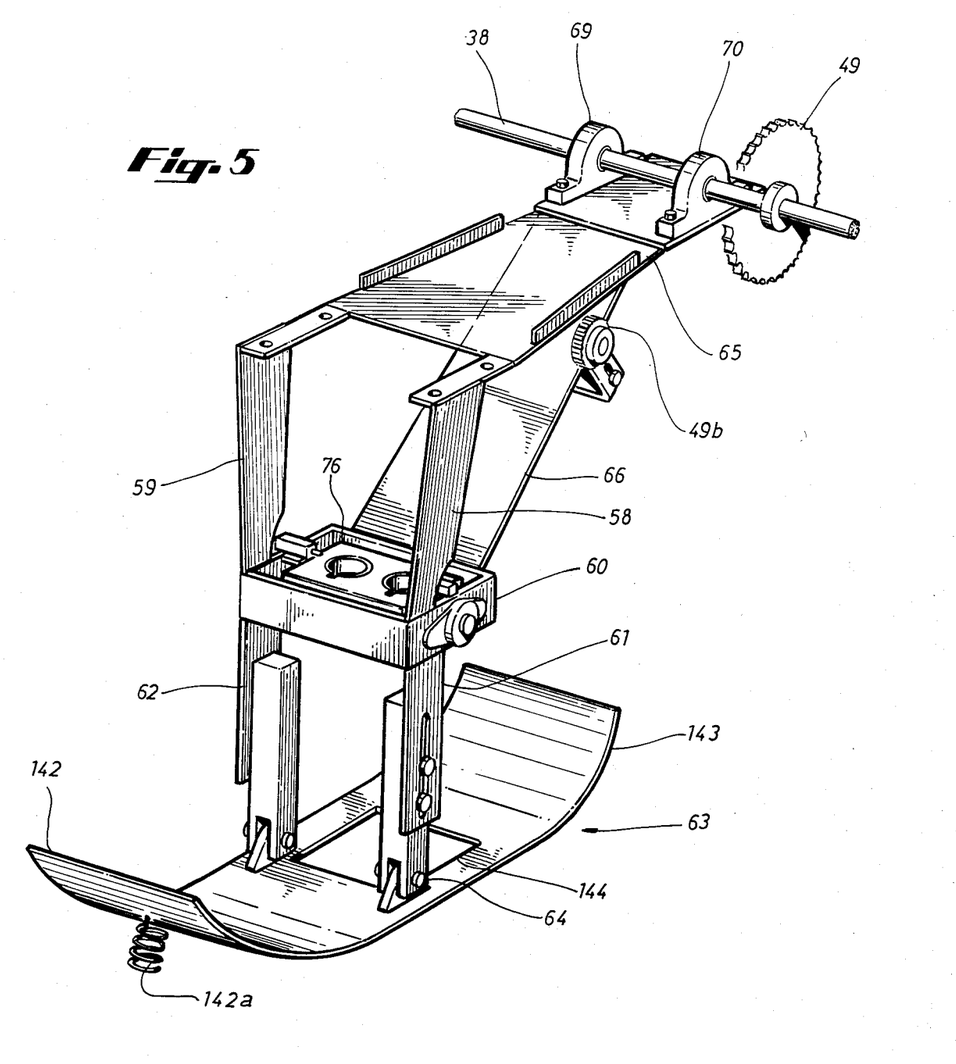
FIG. 5 is a simplified perspective view of the sled assembly which includes the no-till planter, planter support members and its sled.

Referring to FIGS. 2 and 5, the guide tube frame vertical support members 58 and 59 are rigidly attached to horizontal member 65. Also attached to horizontal member 65 is diagonal brace 66 which spans between horizontal member 65 and the guide tube saddle 60. The diagonal brace 66 is rigidly attached to the guide tube saddle 60.

Horizontal member 65, diagonal brace 66, guide tube frame vertical support members 58 and 59 and guide tube saddle 60 constitute the support device for metering and piercing devices 67 and 68. The support device for the metering and piercing devices pivots about the drive shaft 38 by attaching horizontal support member 65 to pillow block bearings 69 and 70. Pillow block bearings 69 and 70 are mounted on the horizontal member 65. The inside diameter of pillow block bearings 69 and 70 are sized to fit around the outside diameter of the drive shaft 38.

Additionally, a means for pivoting the inner and outer members about a horizontal axis essentially perpendicular to the axis of the movement of the support member is provided so that the inner and outer members pierce holes in the soil as the support member moves horizontally over the soil.

Additionally the sled is adjustable in the vertical plane without affecting the pivoting of the sled to permit adjustment of the piercing depth of the piercing members. The sled is further provided with a rotational point about a drive shaft to permit the sled to absorb vertical surfaces by translating the vertical forces to rotational forces.

It can be seen from the foregoing disclosure that any vertical forces acting on sled 63 are absorbed by the sled vertical support members 61 and 62 which in turn are absorbed by the support device for metering and piercing devices which in turn causes horizontal support member 65 to pivot about the drive shaft 38.

Figure 6:
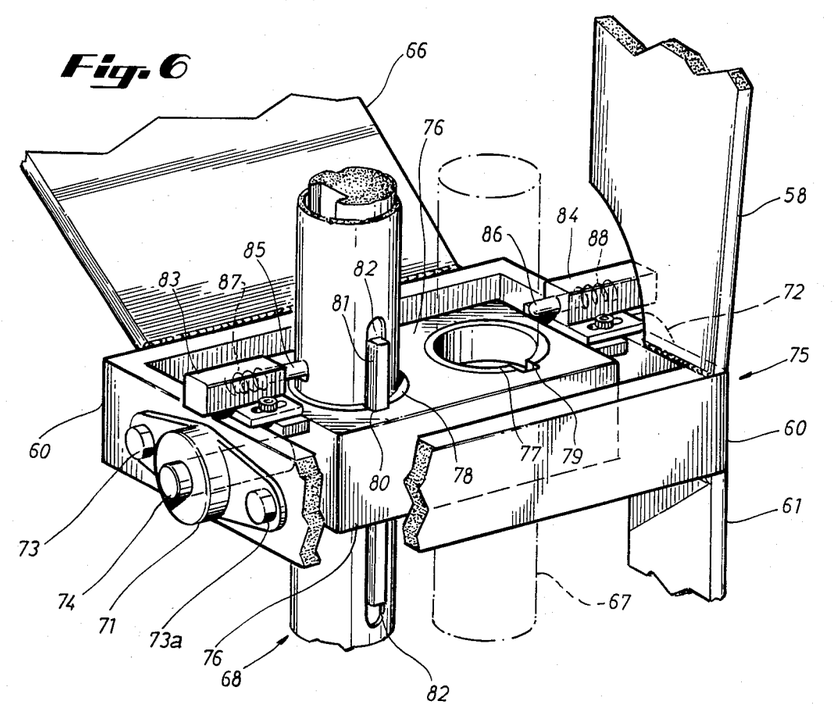
FIG. 6 is a perspective view of the guide tube saddle and guide tube frame.

Referring now to FIG. 6, the guide tube saddle 60 is illustrated partially cutaway and enlarged. Rigidly attached to guide tube saddle 60 are guide tube frame vertical support member 58 and sled vertical support member 61. Guide tube frame vertical support member 59 and sled vertical support member 62 have been cut away for clarity. Also rigidly attached to the guide tube saddle is diagonal support member 66.

FIG. 6 also illustrates that the guide tube saddle 60 is a four-sided frame with two bearings 71 and 72 mounted on opposite outboard ends. Bearings 71 and 72 are mounted by means of bolts 73 and 73a or other suitable means. Bearings 71 and 72 support shaft stubs 74 and 75 respectively. Shaft stubs 74 and 75 protrude from outboard sides of guide tube frame 76. This configuration permits guide tube frame 76 to pivot about a transverse horizontal axis with respect to guide tube saddle 60.

Guide tube frame 76 supports guide tube bushings 77 and 78, which may be made of brass or other suitable material permitting machining to close tolerance, and providing a smooth sliding surface. The outside diameter of metering and piercing devices 67 and 68 are sized to conform to the inside diameter of bushings 77 and 78. Bushings 77 and 78 are partially cut out to accommodate keyways 79 and 80. Rotation about the longitudinal axis of the metering and piercing devices 67 and 68 is prevented by key 81 placed in keyway 82 of the metering and piercing devices 67 and 68 and fitting into keyways 79 and 80 of the guide tube bushings 77 and 78.

Stop pin housings 83 and 84 are rigidly mounted to the guide tube saddle 60. These housings each contain a biased stop pin 85 and 86, respectively, which may be biased by any biasing means such as springs 87 and 88. The function of these members will become apparent from the later decription of the metering and piercing devices.

The construction, operation and function of metering and piercing devices 67 and 68 are similar; therefore, the following description of metering and piercing device 68 is to apply equally to metering and piercing device 67.

Figures 7, 8:
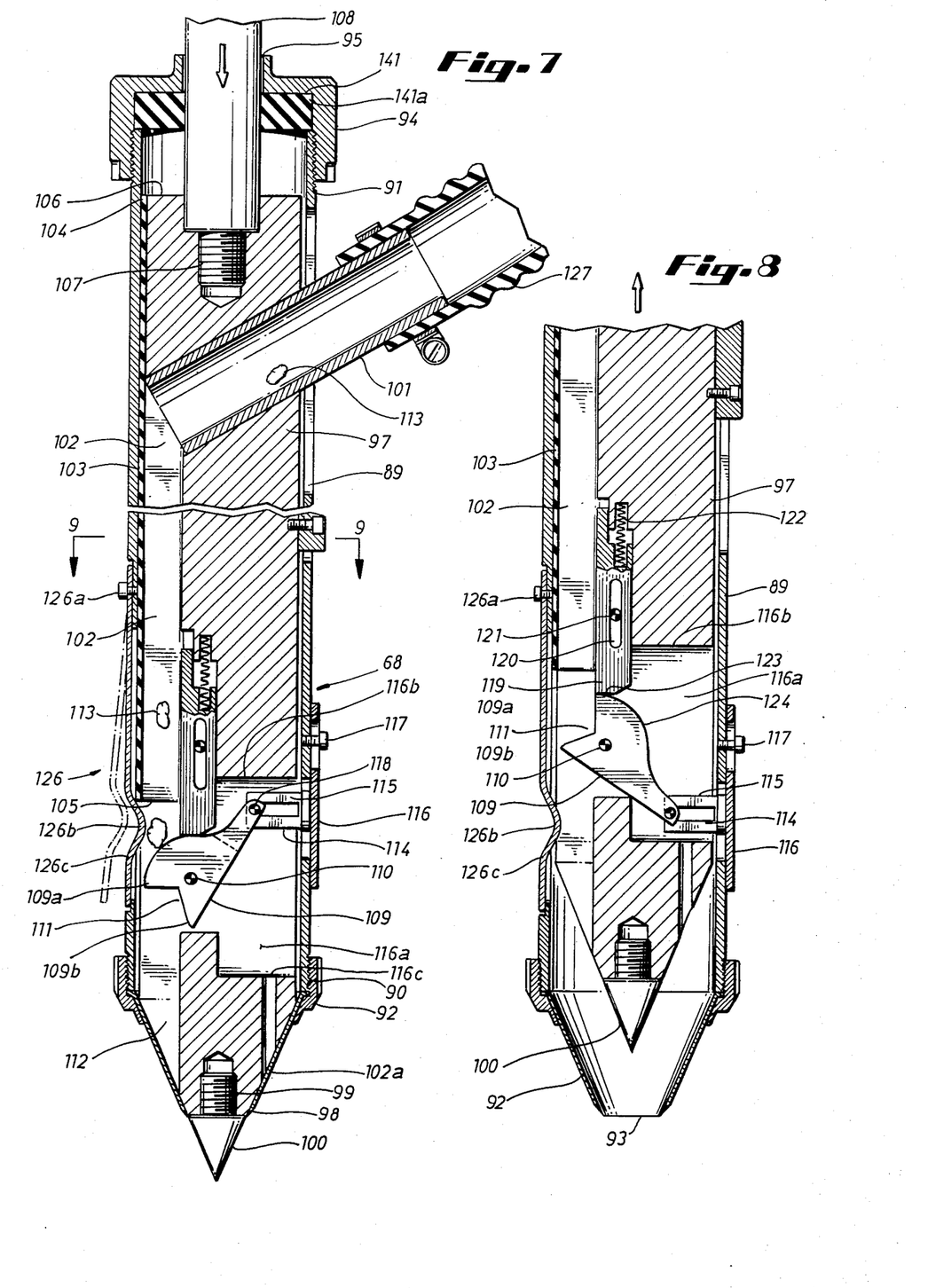
FIG. 7 is a cutaway elevational view of a single metering and piercing device in its downstroke position.
FIG. 8 is a cutaway elevational view of the metering and piercing device in its upstroke position.

Referring now to FIG. 7 a cutaway view of the metering and piercing device 68 is illustrated. Metering and piercing device 68 includes an outer hollow tubular member 89 with a threaded opening 90 at the bottom and threaded openings 91 at its top. A bottom cap 92 is threadedly engaged to the threaded opening 90 of the hollow tubular member 89. Bottom cap 92 is shaped in a frustoconical configuration with an opening or aperture 93 (illustrated in FIG. 8). A top cap 94 is threadedly engaged to the threaded opening 91 of hollow tubular member 89. As illustrated hollow tubular member 89 has a longitudinal slot 96 in the vicinity of the upper threaded end 91 (illustrated in FIG. 10).

Referring again to FIG. 7, a generally circular inner bar 97 with an outside diameter sized to conform to the inside diameter of hollow tubular member 89 is positioned within the hollow tubular member 89. Inner bar 97 ends in a frustum 98. Frustum 98 has concentric threads 99 for the threaded engagement of an inner bar point 100, as shown.

Figures 9, 10, 11:
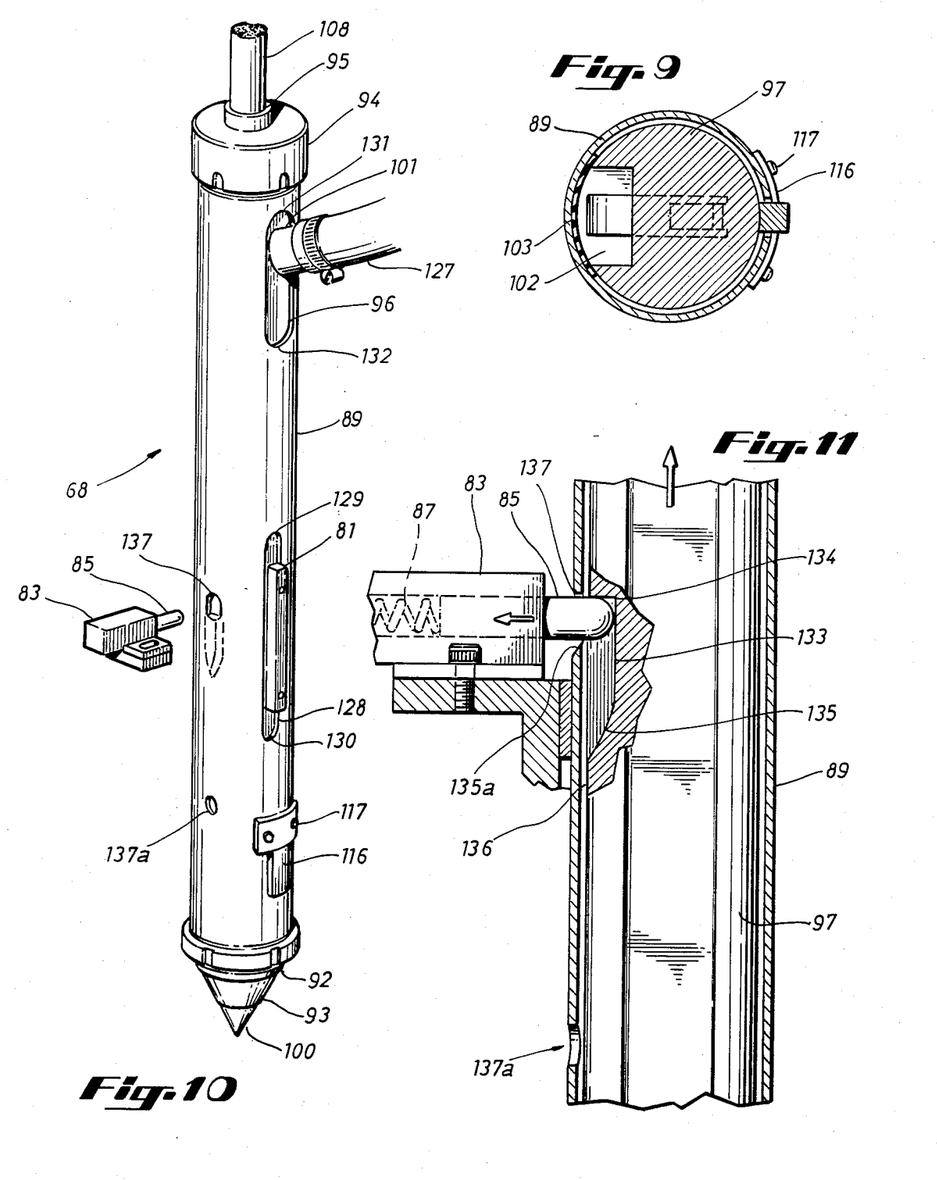
FIG. 9 is a plan view taken along section line 9—9 in FIG. 7.
FIG. 10 is an isometric view of the metering and piercing device.
FIG. 11 is an exploded and cutaway view of the stop pin entering the metering and piercing device.

A feed nipple 101 is attached to inner bar 97 and provides access to feed channel 102 on the outer circumference of circular inner bar 97. A feed hose 127 is attached to the feed nipple 101 for supplying seed or fertilizer from the hopper 42 to the inner bar feed channel 102. Referring to FIG. 9, inner bar feed channel 102 is formed by notching out the outer circumference of inner bar 97. Circular sector 103, formed by conforming a piece of thermoplastic, or other suitable material, to the outer diameter of inner bar 97, is attached to the outer circumference of inner bar 97, thereby forming inner bar feed channel 102 on the outer edge of the inner bar 97. FIG. 7 illustrates that thermoplastic sector 103 extends from top of the inner bar sector slot 104 to the inner bar feed channel bottom 105. Top of inner bar sector slot 104 is located a minimal distance from top 106 of inner bar 97.

The top 106 of circular inner bar 97 has concentric threads 107 to permit the threaded engagement of connecting rod 108. The connecting rod may be attached to the top of inner bar by any other suitable means. Connecting rod 108 extends through and is capable of movement with respect to the concentric opening 95 of top cap 94.

Referring to both FIGS. 7 and 8 a metering device 109 is located within metering and piercing device 68 adjacent to the bottom 105 of feed channel 102. Metering device 109 has a pivot point 110 to permit pivoting of metering device 109 within the circular inner bar 97. Metering device 109 resembles and/or open-mouthed whale or open-mouth 111, wherein mount 111 is pointed downward and exposed to frustoconical feed channel 112 (illustrated in FIG. 7) with the inner bar 97 and outer hollow member 89 in the downstroke just prior and at the time the soil is pierced. Inner bar frustum feed channel 112 is formed by machining part of the outer circumference of the frustum 98.

Referring to FIG. 8, as circular inner bar 97 moves upward with respect to outer tubular member 89 open-mouth 111 of metering device 109 pivots about point 110 causing open-mouth 111 to point upward and thus expose mouth 111 of metering device 109 to the inner bar feed channel 102.

As can be seen by referring to FIGS. 7 and 8 feed material 113, either seed or fertilizer, for example, found in inner bar feed channel 102 is received by the open-mouth 111 of metering device 109 when the inner bar 97 and the hollow outer member 89 are in the upstroke. The feed material 113 is transferred from feed channel 102 to frustum feed channel 112, said transferring securing as the inner bar 97 moves downwardly relative to the outer bar. A more detailed description is provided in a later part of this disclosure to describe the pivoting of the metering device 109. Planting of a seed or depositing of fertilizer is accomplished when inner bar point 100 and bottom cap 92 pierce the soil in unison. Thereafter by moving inner bar 97 upward with respect to the hollow tubular member 89 the metered material which has been deposited in frustum feed channel 112 by the downward position of open-mouth 111 of inverted metering device 109, drops through the open aperture 93 created by the upward movement of the inner bar 92 with respect to outer member 89. Since the inner bar frustum 98 and frustum point 100 are not obstructing the bottom cap aperture or opening 93, the feed material 113 falls out of inner bar frustrum channel 112 and is deposited at below the bottom of lower cap opening 93.

Manipulation and pivoting of metering device 109 and its respective open-mouth 111 is accomplished by manipulators 114 and 115 extending from plate 116 attached to hollow tubular member 89 at point 117. Manipulators 114 and 115 act on tail section 118 of metering device 109. As hollow tubular member 89 moves with respect to inner bar 97, metering device 109 can be made to change positions, thereby moving feed material from inner bar feed channel 102 to frustum feed channel 112.

Plate 116, attached to the outer member 89 also covers metering device slot 116a which is formed in the inner bar to permit insertion and pivoting of the metering device 109. Slot 116a is formed by notching out the outer circumference of the inner bar 97 from top 116b to bottom 116c and by penetrating through the inner bar center section to the feed channel 102.

By varying the size of mouth 111 of the metering device 109, different seed sizes can be accommodated. Additionally variation of mouth 111 of metering device 109, can result in variation of quantity of fertilizer metered and deposited in frustum feed channel 112.

Located above metering device 109, is a biased agitator member 119. Agitator member 119 has a longitudinal slot 120 and is restrained by agitator pin 121. Agitator pin 121 and longitudinal slot 120 define the up-down stroke of the agitator 119. Agitator 119 is biased by means of a biasing device such as spring 122. Agitator member 119 moves up-down along the path defined by longitudinal slot 120 as the bottom 123 of agitator 119 rides on the top 124 of metering device 109. Metering device 109 has a top 124 defined by a circular arc thus permitting smooth travel of agitator 119 along the path defined by longitudinal slot 120.

Agitator 119 keeps feed material such as seed or fertilizer 113, traveling in inner bar feed channel 102, from compacting in the area of open-mouth 111, and minimizes the possibility of feed material entering cavities other than feed channel 102 and frustoconical channel 112. In the unlikely event that feed material inadvertently leaves feed channel 102 or frustoconical channel 112, channel 102a is utilized to drain slot 116a to minimize the possibility of jamming or obstructing the operation of metering device 109. Agitator 119 further permits a smooth and uniform feeding of feed material from inner bar feed channel 102 to the frustum feed channel 112.

To further aid a smooth and uniform metering of material 113 from feed channel 102 to frustoconical feed channel 112 a flexible member 126 is attached to the hollow tubular member 89 adjacent to mouth 111 of metering device 109. Flexible member 126 attaches to outer member at attachment point 126a. Flexible member 126 flexes inward at point 126b with flexible member section 126c in contact with the metering device outboard points 109a and 109b riding on flexible member section 126c as metering device 109 pivots about point 110.

In the event oversized feed material 113 is deposited in open-mouth 111, flexible member 126 flexes out as metering device 109 moves from the inner bar feed channel 102 to the frustum feed channel 112. The flexing of member 126 permits an oversized seed to be metered, by metering device 109, minimizing damage or injury to said seed and thus also minimizing the inadvertent jamming of metering device 109.

Referring to FIG. 10 a composite metering and piercing device 68 is illustrated. The metering and piercing device is illustrated with both the inner and outer bars in their downward positions. Inner bar point 100 is obstructing concentric opening 93 of bottom cap 92. In this position as the outer hollow member moves downward in unison with the inner bar the soil is pierced. Also shown in FIG. 10 is manipulator plate 116 attached at points 117 to the hollow outer member 89. Also illustrated is longitudinal slot 128 extending from the top of the longitudinal slot 129 to the bottom of the longitudinal slot 130. Longitudinal slot 128 defines the range of independent movement which the inner bar 97 has with respect to the outer tubular member 89. Key 81 extends from the inner bar 97, through longitudinal slot 128, and is engaged in keyway 79 or 80 to prevent rotation about the longitudinal axis of the outer tubular member 89 and the inner circular bar 97.

FIG. 10 further illustrates that the feed nipple longitudinal slot 96 includes an upper extremity 131 and a longitudinal slot lower extremity 132. Surfaces 131 and 132 also define the range of independent movement that the inner bar 97 has with respect to hollow tubular member 89. As will be appreciated feed nipple 101 can slide in slot 89 during relative movement of members 96 and 97.

Also illustrated in FIG. 10 is stop pin housing 83 and biased stop pin 85. The purpose of this assembly is twofold. First the stop pin permits the inner bar 97 to move upward, while restraining the outer member 89 in a stationery position, as the camshaft minor axis shaft 57 begins its upward movement, from the bottom dead center position, this restraint is caused by the stop pin 85 penetrating an outer member stop pin hole 137 and the stop pin slot 133 (illustrated in FIG. 1); secondly the stop pin restrains the outer member 89 and permits the inner bar 97 to move downward with respect to the outer member 89, as the camshaft minor axis shaft 57 begins its downward movement, from the top dead center position, this restraint is caused by the stop pin 85 penetrating the stop pin indentation 137a (illustrated in FIGS. 10 and 11).

In a cutaway view illustrated in FIG. 11 stop pin housing 83, stop pin 85 and biasing means 87 are also illustrated. In FIG. 11 the inner bar stop pin slot 133 is illustrated with the inner bar 97 in its full downward position. In that position, the top 134 of stop pin slot 133 is in contact with the top of stop pin 85. Stop pin slot 133 in inner bar 97 also slopes outwardly at a bottom surface 135. As inner bar 97 moves upward with respect to outer hollow member 89 stop pin 85 rides on ramp 135, thereby pushing stop pin 85 against the biasing means 87. With inner bar 97 at the top of its travel, stop pin 85 rides on the outer surface 136 of inner bar 97. At this point, the penetration of stop pin 85 is the skin thickness of outer tubular member 89. This penetration, through the outer skin thickness of hollow tubular member 89, is at stop pin opening 137 of the hollow tubular member 89.

Stop pin opening 137 is angled at the bottom of the outer member 89 with a stop pin opening angle 135a. The stop pin opening angle 135a complements the angle of the stop pin slot ramp 135. Stop pin opening 135a is strengthened by application of hardened steel or other material harder than the outer tube 89 and harder than stop pin 85.

Stop pin 85 is popped out of opening 137 by the upward movement of inner bar 97, as top 106 of inner bar 97 contacts the resilient member 141a of the top cap 94 and thereby pushes the top cap 94 upwards which in turn pushes outer member 89 upwards.

After the stop pin is pushed or popped out of stop pin opening 137, inner bar 97 and outer member 89 move upward together. As inner bar 97 and outer tube 89 reach top dead center of the camshaft minor axis shaft 57, the stop pin 85 engages indention 137a of outer tube 89. Outer tube 89, pauses in this position, until inner bar 97 moves downward with respect to a stationary outer member 89, until inner bar frustrum point 100 comes in contact with frustoconical aperture 93 of outer tube 89. Continued travel of camshaft minor axis shaft 57, forces stop pin 85 out of outer tube indention 137a. As stop pin 85 is forced out of indentation 137a outer tube 89 moves downward in unison with the inner tube 97. The initial downward motion of inner tube 97, independent of the outer tube 89, allows open-mouth 111 of device 109 to move downward thus moving feed material 113 from feed channel 102 to the frustoconical channel 112. The feed material in frustum feed channel 112 does not fall out of aperture 93 since the frustum point 100 has plugged aperture 93. Aperture 93 is plugged by frustum point 100 since the inner bar 97 moved downward independent of the outer tube 89. The independent downward motion of the inner bar 97 resulted from insertion of stop pin 85 in indentation 137a. Once stop pin 85 comes out of indentation 137a the inner bar 97 and outer tube 89 move in unison downward as the camshaft minor axis 57 continues to rotate to the bottom deadcenter position. Both the outer tube 89 and the inner bar frustoconical point 100 are in contact when the soil is penetrated, thus preventing plugging of outer tube aperture 93. The stop pin 85 is engaged into opening 137 in outer tube 89 and slot 133 of inner bar 97 as the camshaft minor axis shaft 57 approaches bottom dead center. The outer tube 89 is held in the down position by stop pin 85 until the inner bar 97 moves upward. The upward movement of inner bar 97 with respect to outer member 89 opens up aperture 93 thus depositing feed material 113, held in frustum feed channel 112, into the soil. As inner bar continues upward, stop pin 85 is forced outward by ramp 135 in the inner bar 97. Simultaneously open-mouth 111 of device 109 is moved to an upward position and remains in this position until the camshaft minor axis shaft 57 reaches top dead center at which time the cycle begins again.

Connecting rod 108 shown in FIG. 7 is attached to the camshaft minor axis shaft 57, illustrated in FIG. 4, by means of saddles 138 and 139 gripping the camshaft minor axis shaft 57 and attached thereto by means of bolts 140 or other similar devices.

In operation the tire 34 is rotated as trailer 31 is pulled across the field by a tractor or other motive means attached to hitch 32. As tire 34 rotates, drive gear 36 is rotated, thus propelling drive chain 37 which in turn rotates drive shaft 38. Rotation of drive shaft 38 results in rotation of camshaft drive gear 49 and thus in turn rotation of camshaft gear 50. As camshaft gear 50 rotates, camshaft major axis 51 rotates resulting in rotation of camshaft stubs 54 and 55. This results in an eccentric rotation of camshaft minor axis shaft 57 thus lifting and lowering connecting rod 108. As rod 108 reaches its bottom of travel, defined as the lowest position of camshaft minor axis shaft 57, the inner bar 97 is in its lowest position. At this point frustum point 100 is protruding through bottom cap aperture 93. With inner bar 97 at its bottom of travel stop pin 85 has penetrated outer member stop pin opening 137 and the top of stop pin slot 134 of inner bar 97 has come to rest on the top of stop pin 85.

The stop pin 85 restrains the outer bar in its downward position with respect to inner member 97. With the camshaft minor axis shaft 57 in its lowest position, inner bar frustum point 100 penetrates the soil. Frustum point 100 is accompanied into the soil by lower cap 92.

At this position the inner bar frustum point 100 and outer member 89 have penetrated and pierced the soil. The cavity created by these devices shall be used to plant a seed or deposit a quantity of fertilizer.

As camshaft minor axis shaft 57 starts its upward travel, from its bottom dead center position, inner bar 97 moves upward with respect to hollow outer member 89, urged upward by connecting rod 108. As the camshaft minor axis shaft 57 begins its upward travel, inner bar 97 begins to move upward with the outer member 89 held in its downward position, in the pierced hole, by the stop pin 85. As inner bar 97 begins to move upward with respect to hollow tubular member 89, feed material 113, i.e., seed or fertilizer, exits from frustoconical feed channel 112 as frustum point 100 moves to clear obstruction of aperture 93. As inner bar 97 continues to move upward with respect to outer member 89, the open-mouth 111 of metering device 109 pivots in a clockwise direction about 110 by manipulator 115 acting on metering device tail 118 as shown in FIGS. 7 and 8. Open-mouth 111 receives feed material 113 which is to be deposited in frustum channel 112 on the subsequent cycle.

Outer member 89 remains in the pierced hole until inner bar 97 stop pin slot ramp 135 has pushed stop pin 85 outward as the top 106 of inner bar 97 reaches bottom of resilient member 141a, at which point stop pin 85 is snapped out of stop pin opening 137 thereby permitting the outer member 89 to move in unison with the inner bar 97. As the top 106 of inner bar 97 pushes on bottom of resilient member 141a, and therefore on bottom 141 of top cap 94, the inner bar 97 and outer member 89 move upward together, thus outer member 89 is lifted out of the pierced hole.

The metering device 109 is ready to meter material on the subsequent piercing cycle. Top 106 of inner bar 97 remains in contact with the resilient member 141a of top cap 94 as the camshaft minor axis shaft 57 reaches the apex of its travel. The physical contact of top 106 of inner bar 97 with resilient member 141a of top cap 94 enables the hollow tubular member 89, its bottom cap 92, and bottom cap aperture 93 to be moved out of the soil. With the hollow tubular member 89, its bottom cap 92 and bottom cap aperture 93 out of the soil the transporting device may be advanced in the horizontal plane to the next piercing point.

The resilient member 141a is inserted between top of inner bar 106 and bottom 141 of top cap 94 to dampen vibration and sound which are caused by top of inner bar 106 urging bottom 141 of top cap 94 upwards.

As the camshaft minor axis shaft 57 reaches top dead center and approaches movement downward, stop pin 85 enters opening 137 of outer member 89, thus holding outer member 89 stationary with respect to the inner bar 97, until point 100 travels sufficiently to obstruct aperture 93.

Simultaneously with the blocking of aperture 93 by inner bar point 100 as described in the paragraph above, the metering device 109 pivots in a clock-wise direction about point 110, by manipulator 114 acting on metering device tail 118 as shown in FIGS. 7 and 8. The downward tilting of open-mouth 111 enables metering device 109 to take and measure feed material 113 from feed channel 102 to frustoconical channel 112.

Feed material 113 is moved, by metering device 109, from feed channel 102 to the frustum feed channel 112, as the metering device is actuated by the relative motion of the inner bar with respect to the outer bar since the outer member 89 is held stationary with respect to the inner bar by stop pin 85 entering hollow member indentation 137a.

Travel of outer member 89 is momentarily restrained by stop pin 85 penetrating opening 137a. Once inner bar point 100 obstructs aperture 93 stop pin 85 is urged out of opening 137a as the outer bar begins to travel downward in unison with the inner bar 97, the inner bar urged downward by action on connecting rod 108 caused by camshaft minor axis shaft 57.

As inner bar 97 continues to move downward, urged by connecting rod 108 as camshaft minor axis shaft 57 rotates the outer tube 89 continues its downward travel with frustum point 100 protruding through bottom cap aperture 93, thus moving hollow tubular member 89 downwards in unison with inner bar 97.

As camshaft minor axis shaft 57 continues to move downward outer member 89, moving in unison with the inner bar 97, pierces the soil and continues downward to the deepest penetration point. At the deepest penetration point the camshaft minor axis shaft 57 is at bottom dead center.

With outer member 89 at its lowest position shaft 57 is at bottom dead center. At this position stop pin 85 enters outer member stop pin opening 137 into inner bar stop pin slot 133.

With each complete rotation of the camshaft minor axis shaft 57, the soil is pierced by the inner bar frustum point 100 in unison with the outer tubular member bottom cap 92 and aperture 93. As the camshaft 57 begins to travel upward from the bottom dead-center position, inner bar 97 starts upward thereby causing the metering device 109 to move open-mouth 111 from its downward position to its upward position. Additionally the upward motion results in, metered seed or material in the frustoconical channel 112 dropping through unobstructed aperture 93. With each upward and downward movement the soil is pierced to a predetermined depth, seed or fertilizer is deposited, and the outer tubular member 89 raised. At a predetermined spacing the soil is again pierced, seed or fertilizer deposited and the outer member raised again. This continuous circular motion of the camshaft minor axis shaft 57 permits the piercing of soil to a predetermined depth and placing of seed and/or fertilizer at a predetermined spacing on a consecutive and continuous basis.

A proximity detector at the bottom of inner bar feed channel 102, may be utilized to detect feed material falling into open-mouth 111 of metering device 109. In the event the inner bar feed channel 102 becomes clogged, the proximity detector would detect the lack of material in the open-mouth 111, of metering device 109, thereby notifying the operator that the system is inoperative thus requiring remedial action on the part of the operator.

Referring to FIG. 2 sled 63 rides along the surface of the soil. Sled 63 is pointed upward at 142 and 143. As the sled 63 is pulled across the ground, point 143 and 142 prevent snagging and sticking of sled 63. Sled 63 has a slot 144 as illustrated in FIGS. 1 and 5. Slot 144 permits movement of the sled 63 with the metering and piercing devices 67 and 68 in the soil, before they are lifted out of the soil. Sled 63 also has a flexible scratcher 142a which moves any displaced soil back into the pierced hole after the seed is deposited.

It is to be understood that as the metering and piercing devices 67 and 68 move upward and downward some means to accommodate rocking motion is needed. This rocking motion is established by the eccentric motion provided to the inner bar 97 by the camshaft minor axis shaft 57 rotating in an eccentric fashion about the camshaft major axis 51. The rocking motion is accommodated by the guide tube frame 76. Additionally the ability of sled 63 to pivot about shaft 38 enables the sled 36 and therefore the metering and piercing devices 67 and 68 to achieve a leap-frog effect as the sled 63 is pulled across the soil. That is the metering system, in effect, pivots about a horizontal axis (defined by shaft 38) perpendicular to the axis of movement of the support (i.e., perpendicular to the trailer path).

It should also be understood that in the event sled 63 moves upwardly, (because of an obstruction on the ground) the upward movement is translated to a rotational movement by diagonal member 66 and horizontal member 65. The upward movement on sled 63 results in a transverse rotational movement of pillow block bearings 69 and 70 about the drive shaft 38. (See FIGS. 1 and 5).

Minor elevational variations, as for example those caused by clods of soil and uneven turf, may also be absorbed and compensated for by the pivot point 64 of sled 63.

Figure 12:
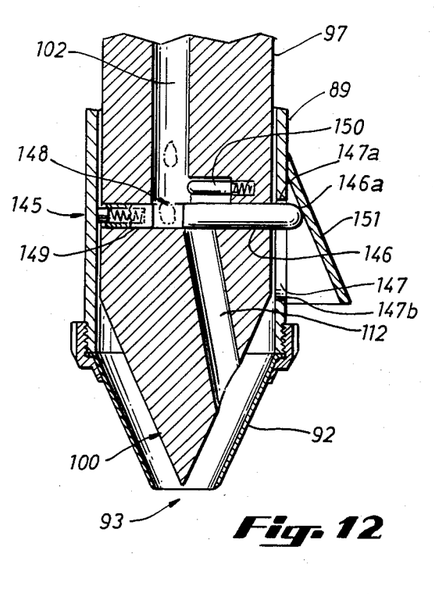
FIG. 12 is a cutaway view of an alternate embodiment of the metering device in the downstroke position.
Figures 12A, 14, 15:
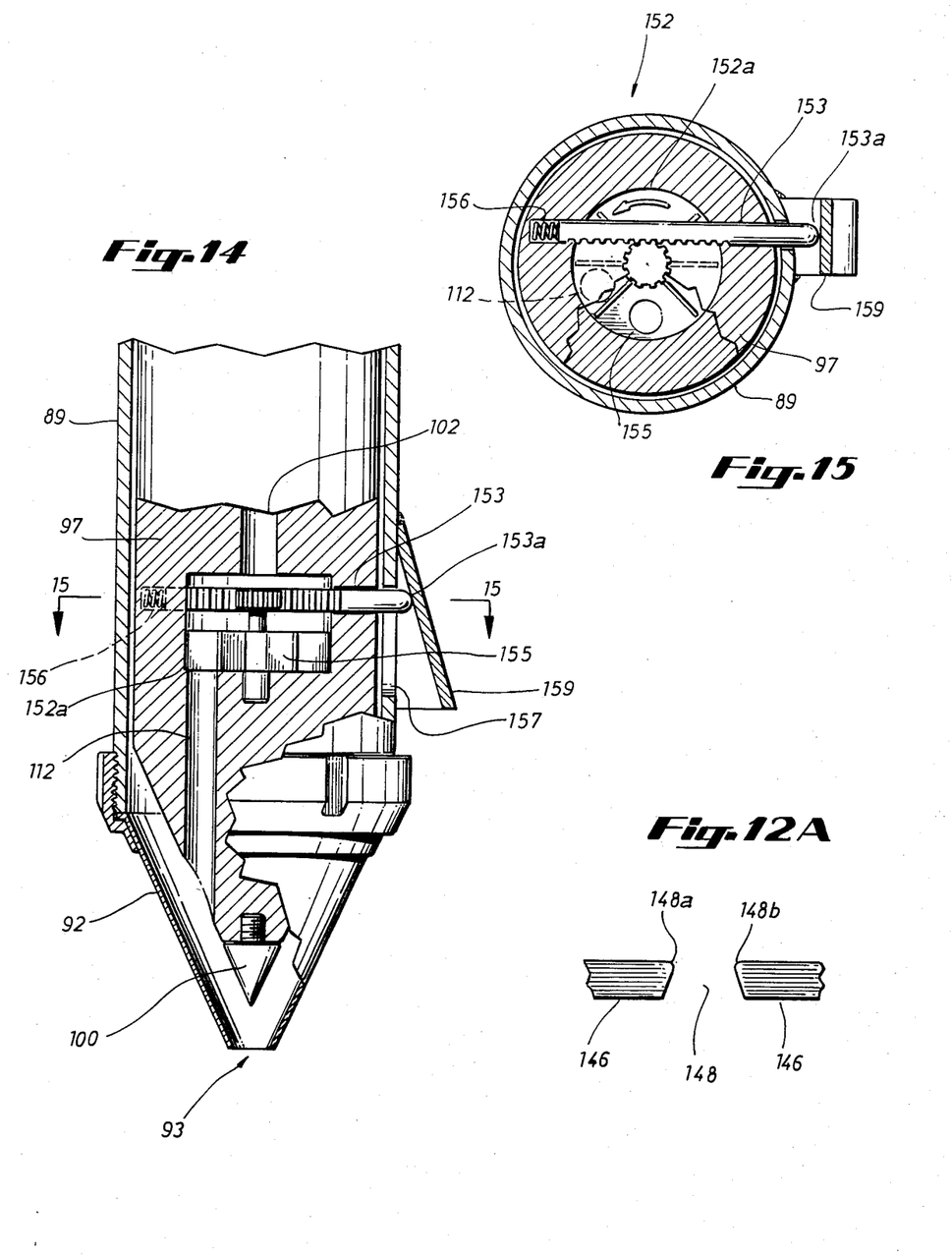
FIG. 14 is a second alternate embodiment of a metering device in its downstroke position.
FIG. 15 is a plan view of the second alternate embodiment illustrated in FIG. 14 taken along section line 15 in FIG. 14.
Figure 13:
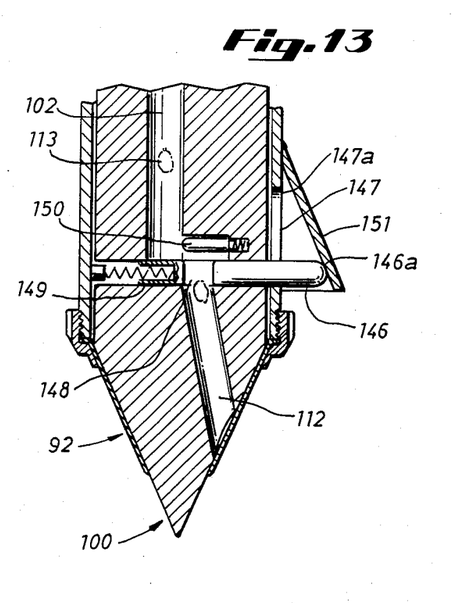
FIG. 13 is an alternate embodiment of the metering device illustrated in FIG. 12 in its upstroke position.

An alternate embodiment of the metering device 109 is illustrated in FIGS. 12 and 13. In FIGS. 12 and 13 a metering device 145 is illustrated. Metering device 145 is a spring biased slide bar 146. The metering device 109 may be replaced by metering device 145. Slide bar 146 is biased to move horizontally within the inner bar 97. The slide bar 146 slides out of outer tube 89 through longitudinal slot 147 formed by top 147a and bottom 147b. Slot 147 is a longitudinal slot formed in wall of the hollow outer member 89. The slide bar 146 has a conduit 148. The conduit 148 is formed in a configuration as detailed in Detail 12a. Referring to FIG. 12 conduit 148 is exposed to the inner bar feed channel 102 when the inner bar 97 moves upward with respect to the hollow outer member 89. The upward movement of inner bar 97 and hollow outer member 89 occurs in the same manner as previously described. Except for the metering system all other aspects of the alternate embodiment are as hereinbefore described. The conduit 148 remains exposed to the inner bar feed channel 102 as both the inner bar 97 and the hollow outer member 89 move upward.

At the beginning of the planting cycle with the camshaft minor axis shaft 57 at bottom dead center, the outer member 89 and the inner bar 97 are at their deepest penetration point i.e., deepest insertion point in the soil. As the camshaft minor axis shaft 57 begins to rotate upward, from bottom dead center, the stop pin 85 is in outer member opening 137 and in inner bar stop pin slot 135. With the stop pin 85 in this position the outer member 89 is held stationary and the inner bar 97 moves upward with respect to the stationary outer member 89. As the inner bar 97 moves upward with respect to the hollow outer member 89 the slide bar 146 moves horizontally against the bias member 149, thereby moving conduit 148 from furstoconical channel 112 to feed channel 102. The slide bar 146 is urged inward by the decreasing gap between finger 151 and the slot 147. Feed material from the inner bar feed channel 102 is thus deposited in conduit 148.

The outer member 89 and inner bar 97 work in a similar fashion to the previously described embodiment through the balance of the camshaft minor axis shaft 57 upstroke.

On the downstroke of camshaft minor axis shaft 57, beginning with shaft 57 at top dead center, stop pin 85 penetrates indentation slot 137a, thereby holding the outer member 89 temporarily stationary with respect to the inner bar 97. Inner bar 97 moves downward with respect to stationary outer member 89 until frustum point 100 obstructs aperture 93. Thereafter the inner bar and outer bar move in unison together as previously described in previous embodiment.

As inner bar 97 moves downward with respect to outer member 89, slide bar 146 moves horizontally outward since the gap between slot 147 and outer member finger 151 increases. As the gap increases slide bar tip 146a slides down finger 151 thereby permitting slide bar 146 to move horizontally outward.

This horizontal movement is effected by biasing means 149. The outward horizontal movement moves feed material 113 from the feed channel 102 to the frustoconical channel 112.

Passage of feed material 113 through frustoconical channel 112, is obstructed by the blocking of the frustoconical channel outlet by the downwardly converging shape of the bottom cap 92. Piercing of soil by the outer member 89 and inner bar 97 is accomplished as previously described.

A spring biased agitator bar 150 is located above and immediately adjacent to horizontal slide bar 146. The agitator 150 acts in cooperation with the conduit 148 construction illustrated in Detail 12a, thus minimizing jamming of slide bar 146 and also minimizing the possible damage to feed material 113.

An additional alternate embodiment is illustrated by FIGS. 14 and 15. In FIGS. 14 and 15 the metering device 109 may be replaced by metering device 152. Metering device 152 is made up of a cylinder 152a with a spring biased pawl 153 and ratchet 154. The cylinder 152a has at least one chamber 155. Chamber 155 is exposed to the inner bar feed channel 102 when both the inner bar 97 and hollow outer member 89 are in the upstroke. The chamber 155 remains exposed to the inner bar feed channel 102 as both the inner bar 97 and the hollow outer member 89 move upward. The movement of inner bar 97 and hollow outer member 89 are identical to that previously described.

Beginning the planting cycle with the camshaft minor axis shaft 57 at bottom dead center, the outer member 89 and the inner bar 97 are at their deepest penetration point. As the camshaft minor axis shaft 57 begins to rotate upward from bottom dead center the stop pin 85 is in outer member opening 137 and in inner bar stop pin slot 133. At this point chamber 155 is aligned with frustoconical feed channel 112. Since stop pin 85 is in opening 137 outer member 89 is held stationary and the inner bar 97 moves upward with respect to the outer member 89 as previously discussed. As the inner bar 97 moves upward with respect to the hollow outer member 89, the pawl 153 pushes against a biasing means 156. Biasing means 156 may be a spring. The spring biased pawl 153 moves through a pawl longitudinal slot 157 in the hollow outer member 89. Pawl 153 is urged inward by outer member finger 159 as pawl 153 travels up finger 159. The gap between finger 159 and outer member 89 decreases as pawl point 153a moves upward with respect to the outer member 89.

The outer member 89 and inner bar 97 work in a similar fashion to the previously described embodiment through the balance of the camshaft minor axis shaft 57 upstroke.

On the downstroke of shaft 57, beginning with shaft 57 at top dead center, stop pin 85 penetrates indention slot 137a, thereby holding the outer member 89 stationary with respect to the inner bar 97. Inner bar 97 moves downward with respect to stationary outer member 89 until frustum point 100 obstructs aperture 93. Thereafter the inner bar and outer bar move in unison together as previously described in the previously described embodiment.

As inner bar 97 moves downward with respect to outer member 89, pawl 153 moves horizontally outward, since the gap between outer member 89 and outer member finger 159 increases. Outer member finger 159 is attached to outer member 89.

Horizontal movement of pawl 153 is aided by bias member 156. The outward horizontal movement moves feed material 113 from the feed channel 102 to the frustoconical channel 112.

Passage of feed material 113 is obstructed by the blocking of frustoconical channel 112 outlet by the downwardly converging shape of the bottom cap.

Piercing of soil by the outer member 89 and inner bar 97 is accomplished as previously described.

On the subsequent upstroke, as spring biased pawl 153 moves inward it advances the cylinder 152a thereby rotating the cylinder in the horizontal plane. The rotation of the cylinder in the horizontal plane moves feed material from the inner bar feed channel 102 to the frustoconical feed channel 112. The feed cylinder 152a is advanced in the horizontal plane by the upward movement of hollow outer member 89 with respect to inner bar 97 in each complete rotation of the camshaft minor axis shaft 57. The feed cylinder 152a is advanced in a manner similar to the advancement of a cylinder in a hand gun or revolver.

There has been provided in accordance with the present invention a no-till planter which has been described in terms of a specific embodiment thereof; however, many alternatives, modifications and variations will be apparent to those skilled in the art from the foregoing description. Accordingly, this disclosure is intended to embrace all such alternatives, modifications and variations that fall within the spirit and scope of the appended claims.

What is claimed is:

1. An apparatus for repeatedly and successively penetrating the soil, to a predetermined depth at a predetermined spacing, and depositing a quantity of material comprising:
   (a) means for storing material and transporting the material to a metering device;
   (b) a metering device which meters and measures the material to be deposited;
   (c) a vertically disposed, pivotally mounted piercing device to pierce the soil with an opening to permit depositing said metered material in the soil, said piercing device operating in a manner to minimize plugging of the opening as the soil is pierced, said metering device operatively coupled to said piercing device;
   (d) a drive train to simultaneously operate the piercing device and metering device;
   (e) means for horizontally transporting storing means, metering device, piercing device, and drive train; and
   (f) means for coupling the metering device, piercing device and transporting means wherein the drive train and transportation means operate cooperatively thereby mechanizing the metering device and piercing device;
   (g) a sled assembly, wherein the piercing device and metering device are pivotably mounted to said sled assembly thereby permitting the metering device and piercing device to operate in the vertical plane, while the transporting means moves in the horizontal plane, thereby achieving a leap frog effect.

2. The apparatus described in claim 1 wherein said sled assembly is vertically adjustable to permit vertical adjustment of depth pierced by piercing device.

3. An implement for dispensing seed or fertilizer in soil without plowing, comprising:
   (a) support means;
   (b) means for moving the support means horizontally across soil;
   (c) an inner and outer member, pivotally mounted to the support means, said inner and outer member piercing holes in the soil, the outer member being tubular and having an open lower end formed by a frustoconical end portion, the inner member being mounted internally of the outer member, and terminating in a generally cone-shaped lower end which facilitates the insertion of both the inner and outer members in the soil, the cone-shaped lower end and the frustoconical end portion forming an internal dispensing chamber when in engagement with one another;
   (d) a metering system internally of the inner and outer members and positioned above the dispensing chamber for metering seed or fertilizer to said internal dispensing chamber;
   (e) means for supplying seed or fertilizer to said metering system;
   (f) motive means for
      (i) downwardly moving the inner and outer members together, with the lower ends thereof in engagement, for piercing a hole in the soil;
      (ii) moving the inner member upwardly relative to the outer member while the outer member is in the soil in order to enable the dispensing of seeds or fertilizer from the dispensing chamber into the hole formed by the inner and outer members;
      (iii) upwardly moving the inner and outer members together for removal from the soil; and
      (iv) moving the inner member downwardly relative to the outer member to re-establish engagement between the cone-shaped lower end portion of the inner member and the frustoconical lower end of the outer member; and
   (g) means for pivoting the inner and outer members about a transverse horizontal axis essentially perpendicular to the axis of movement of the support member so that the inner and outer members pierce holes in the soil as the support member moves horizontally over the soil.

4. An apparatus for repeatedly and successively penetrating the soil and depositing a quantity of material comprising:
   (a) a piercing and metering device comprising
      (i) a pivotally mounted hollow outer member with openings at each end, a bottom cap attached to said hollow outer member, said bottom cap attached to the bottom of the hollow outer member and shaped in a frustoconical configuration with an aperture sized to permit an inner bar frustoconical point to penetrate the bottom cap, a top cap attached to the top of the hollow outer member with an aperture in the center of said top cap to permit access to the inner bar;
      (ii) an inner bar within said pivotally mounted hollow member; said inner bar terminating at the bottom end with a frustoconical point; said frustoconical point having a channel to permit passage of material through the frustoconical point; the inner bar further having a feed channel to permit passage of material from top of the inner bar;

(iii) connecting rod coupled to the inner bar and penetrating the aperture of the top cap;

(iv) a metering device which takes and measures an amount of material from the inner bar feed channel and deposits it in the channel of the frustoconical portion of the inner bar;

(v) a longitudinal slot in the hollow outer member, the longitudinal slot adjacent to an opening in the inner bar, the inner bar opening connected to the inner bar feed channel, said longitudinal slot permitting vertical movement of the inner bar independent of the hollow outer member;

(b) means for providing feed material to the metering and piercing device;

(c) a drive train; and (d) a transport means.

5. The apparatus described in claim 4 wherein an agitator block is located adjacent to the inner bar channel and above the metering device.

6. The apparatus described in claim 4 wherein the piercing and metering device is pivotally mounted to a sled thereby permitting the piercing and metering device to operate in the vertical plane while the transporting means moves in the horizontal plane thereby achieving a leap frog effect.

7. The apparatus described in claim 4, wherein the piercing and metering device are pivotally and adjustably mounted to a sled, to permit adjustment of the depth pierced by the metering and piercing device.

8. The apparatus described in claim 4 further comprising an eccentric camshaft with a major axis and a minor axis with the minor axis of the camshaft coupled to the upper end of the connecting rod and the major axis of the camshaft operatively coupled to a drive gear.

9. The apparatus described in claim 4 further comprising a metering device within the inner bar which takes an amount of material from the inner bar feed channel and deposits it in the frustoconical channel.

10. The apparatus described in claim 4 further comprising a spring biased agitator block located adjacent to and above the metering device and adjacent to the inner bar feed channel and actuated by the circular surface on the metering device.

11. The apparatus described in claim 4 further comprising a longitudinal slot in the hollow outer member, said longitudinal slot adjacent to an opening in the inner bar, said inner bar opening connecting a feed nipple to an inner bar feed channel whereby the longitudinal slot permits the outer member to move independently of the feed nipple location.

12. The apparatus described in claim 4 wherein the hollow member is a hollow tubular member, the inner bar is a circular inner bar and inner bar channel is notched out of the outer circumference of the circular inner bar and a sheath conforming to the outer diameter of the circular inner bar covers the notched out portion of the circular inner bar thereby describing an inner bar feed channel.

13. The apparatus described in claim 4 wherein the metering device is connected to the inner bar by a pivot pin and operatively coupled to the outer bar, said metering device taking an amount of material from the inner bar feed channel and depositing it in the inner bar frustoconical channel said metering device resembling an open-mounted whale, with the open mouth exposed to the inner bar feed channel when both the outer hollow member and the inner bar are in the up stroke, the open mouth remaining exposed to the inner bar feed channel as both the inner bar and outer hollow outer member begin moving downward; the open mouth tilting downward removing feed material from the inner bar feed channel and placing it in the frustoconical channel as the inner bar moves downward with respect to the outer hollow member; the open mouth tilting upward again at the time that the inner bar moves upward with respect to the outer member, such upward movement of the inner bar occurring just prior to the stop pin being snapped out of the stop pin hole in the hollow outer member.

14. The apparatus described in claim 4 above wherein a flexible material replaces a portion of the hollow outer member adjacent to the metering device whereby the flexible material flexes outward in the event an oversized piece of feed material is moved by the metering device from the inner feed channel to the frustoconical channel to minimize the possibility of jamming the metering device and damaging the feed material.

15. The apparatus described in claim 4 above, wherein the metering device is a cylinder with a spring biased pawl and ratchet, said cylinder having at least two chambers, wherein one chamber of the cylinder is exposed to the inner bar feed channel when both the inner bar and the hollow outer member are in the upstroke, the chamber remains exposed to the inner bar feed channel as both the inner bar and the hollow outer member move upward in unison, the spring biased pawl moving outward thru a pawl slot in the hollow outer member, thereby rotating the cylinder in the horizontal plane, thereby moving feed material from the inner bar feed channel to the frustoconical channel as the inner bar moves downward with respect to the hollow outer member; said inner bar movement causing the pawl to advance the ratchet located on the cylinder; the cylinder rotating in the horizontal plane to expose an empty chamber of the cylinder to the inner bar feed channel, as the spring biased pawl moves outward as the spacing between the outer member and the outer member finger increases; after the metering and piercing device reaches its lowest point the inner bar moves upward while the outer bar is held stationery thus opening the aperture and depositing material in the soil, thereafter the bias means of the pawl is held in compressed state as hollow outer member moves upward in unison with the inner bar as the stop pin is snapped out of the stop pin hole in the outer hollow member.

16. The apparatus described in claim 4 further comprising a guide tube saddle wherein the outer hollow member is secured by a circular bushing extending around the circumference of the outer hollow member, said bushing sized to permit the hollow outer member to freely move upward and downward along the longitudinal axis, the centerline of the bushing coincident with a tube guide shaft extending outward at two points, the two points being 180° apart, said shaft attached to the guide tube saddle, the guide tube saddle being a rigid frame with two pillow block bearing mounts and two bearings, each bearing restraining the opposite ends of the tube guide shaft whereby the hollow tube and its bushing can pivot in the horizontal plane of the tube guide saddle.

17. The apparatus described in claim 4 further comprising a spring biased stop pin which penetrates a stop pin opening in the outer hollow member and a tapered stop pin notch in the inner bar, the stop pin opening on the outer member oriented to be adjacent to and aligned with the inner bar stop pin notch.

18. The apparatus described in claim 17, above wherein the metering device is a spring biased slide bar with an internal conduit in the slide bar, said slide bar biased to move horizontally within the inner bar and thru a slide bar slot in the hollow outer member, wherein the conduit is exposed to the inner bar feed channel when both the inner bar and the hollow outer member are in the upstroke, the conduit moving from the feed channel to the frustoconical channel as the inner bar moves downward with respect to the hollow outer member, the slide bar and its internal conduit moving horizontally, assisted by the bias means, thereby moving feed material from the inner bar feed channel to the frustoconical channel; the slide bar and its internal conduit further moving horizontally and compressing the bias means as the inner bar moves upward with respect to the outer bar, to again expose the slide bar conduit to the inner bar feed channel as the slide bar is urged inward by the upward movement of the hollow outer member acting on outer member finger; the inner member moving upward independent of the outer member as the stop pin travels up the inner bar stop pin notch.

19. The apparatus described in claim 4 further comprising a pivoting guide tube saddle member for mounting the outer hollow member such that the outer hollow member and the inner bar pivot about a transverse horizontal axis of the guide tube saddle.

20. The apparatus described in claim 19 further comprising a sled operatively coupled to the pivoting guide tube saddle member such that the sled pivots about a second transverse horizontal axis, and said sled is adjustable in the vertical plane to vary the penetration depth of the inner bar and hollow tubular member.

21. The apparatus described in claim 19 wherein the pivoting guide tube saddle member has a keyway, said keyway retaining a key protruding from the inner bar through the hollow outer member, thereby permitting the hollow outer member and the inner bar to move along the vertical axis while restricting rotation of the hollow outer member and the inner bar about their longitudinal axis.

22. An apparatus for repeatedly and successively penetrating the soil and depositing a quantity of seed and adjacent thereto depositing a quantity of fertilizer, the fertilizer and seed being deposited at a predetermined depth and at a predetermined spacing comprising:
  (a) two metering and piercing devices, one of the metering and piercing devices to meter seed, pierce the soil and deposit the seed in the pierced soil, the other metering and piercing device to meter fertilizer, pierce the soil and deposit the fertilizer in the pierced soil, each metering and piercing device having:
    (i) a hollow outer tubular member with a bottom cap attached to the bottom, the bottom cap shaped in a frustoconical configuration with an aperture sized to permit the inner bar frustoconical point to penetrate the cap and a top cap attached to the hollow outer member with an aperture in the center of said top cap to permit access to the inner bar, said outer tubular member secured by a circular bushing extending around the circumference of the hollow tubular member, said bushing sized to permit the tubular member to freely move upward and downward along the longitudinal axis, the bushing further having a means to restrain about the longitudinal axis rotation of the hollow outer tubular member and the inner bar while permitting the hollow outer tubular member and the inner bar to move in the vertical plane, and a stop pin opening;
    (ii) a circular inner bar and metering device within said hollow tubular member; said inner bar terminating at the bottom end with a frustoconical point, said frustoconical point having a feed channel to permit passage of the metered material past the frustoconical point; the inner bar further having a feed channel to permit passage of the material from the top of the inner bar to the metering device, said inner bar channel notched out of the outer circumference of the circular inner bar with a sheath conforming to the outer diameter of the circular inner bar to cover the notched out portion of the circular inner bar thereby describing a channel, a tapered stop pin notch on one side of the inner bar aligned with the outer tubular member stop pin opening with a receding wall such that the deepest point of the stop pin notch is above the shallowest point of the stop pin notch;
    (iii) a connecting rod with upper and lower ends, said lower end coupled to the inner bar and penetrating the aperture of the top cap;
    (iv) a metering device within the inner bar, said metering device taking an amount of material from the inner bar feed channel and depositing it in the inner bar frustoconical channel, the metering device resembling an open-mouthed whale with the open mouth exposed to the inner bar channel when both the outer hollow member and the inner bar are in the up-stroke, the open mouth tilting downward metering and moving feed material from the inner bar feed channel and placing it in the frustoconical channel as the inner bar moves downward with respect to the outer hollow member, the downward movement of the inner bar occurring when the camshaft is rotated; the open mouth tilting upward again at the point that the inner bar moves upward with respect to the outer member, such upward movement occurring when the stop pin is in the stop pin hole in the hollow outer member, and the stop pin notch in the inner bar;
    (v) an agitator block located adjacent to and above the metering device and adjacent to the inner bar channel actuated by the metering device;
    (vi) a longitudinal opening in the hollow outer member for attaching a feed hose to a feed nipple protruding from the inner bar, said feed nipple connected to the inner bar feed channel;
  (b) an eccentric camshaft with a major axis and a minor axis, with the minor axis coupled to the upper ends of the each of the connecting rods and the major axis operatively coupled to a drive shaft;
  (c) a guide tube 4-sided frame wherein the bushing supporting the fertilizer metering and piercing device and the bushing supporting the seed metering and piercing device are mounted adjacent to each other, with circular shafts extending from two sides of the frame, said sides being the ones with the narrowest dimension;
  (d) a guide tube saddle with a rigid frame, two pillow block bearing mounts and two bearings, each bearing restraining the opposite ends of the tube guide frame circular shaft, whereby the hollow tubes and their bushings can pivot about a transverse horizontal axis of the guide tube saddle;

(e) two spring biased stop pins mounted on the guide tube saddle, one aligned with the outer hollow member stop pin opening of the fertilizer metering and piercing device, the other stop pin aligned with the outer hollow member slot pin opening of the seed metering and piercing device;

(f) a sled operatively coupled to the guide tube saddle such that the sled pivots about a second transverse horizontal axis as the eccentric cam rotates, said sled adjustable in the vertical plane to vary the penetration depth of the inner bar and hollow tubular member;

(g) a drive shaft operatively coupled to the major axis of the camshaft;

(h) a drive train to operate on the drive shaft;

(i) means for storing seed and fertilizer;

(j) means for supplying seed and fertilizer from each respective storage means to each respective metering and piercing device;

(k) a device for transporting metering and piercing devices, drive train, and storage means.

23. The apparatus described in claim 22 wherein the presence or lack of presence of feed material in each of the inner bar feed channels, above the metering devices, is detected by a proximity detector, said proximity detector alerting the operator of a misfeed.

24. A method of repeatedly piercing a hole in the ground for depositing seeds or fertilizer without plowing, comprising:

(a) moving a support member horizontally over soil;

(b) supplying fertilizer or seeds to a first chamber above a metering system internally of inner and outer members which are carried by the support member, the members being capable of piercing a hole in the soil, the outer member being tubular and having an open lower end forming a frustoconical end position, the inner member being mounted internally of the outer member and terminating in a generally cone-shaped lower end which facilitates the insertion of both the inner and outer members in the soil as the support member is moved horizontally over the soil, the inner and outer members forming a second chamber above the frustoconical end of the inner member when the cone-shaped lower end portion is in engagement with the frustoconical end portion for blocking the lower end of the inner member;

(c) simultaneously moving the inner and outer member vertically downwardly together for piercing a hole in the soil;

(d) displacing the inner member upwardly relative to the outer member while the outer member is in the soil in order to unblock the lower end of the outer member and to enable the dispensing of seeds or fertilizer from said second chamber into the hole formed by the inner and outer members;

(e) moving the inner and outer members vertically upwardly together for removal from the soil;

(f) displacing the inner member downwardly relative to the outer member to re-establish engagement between the cone-shaped lower end portion of the inner member and the frustoconical lower end of the outer member;

(g) taking and metering a predetermined amount of seed or fertilizer from the first chamber and depositing said predetermined amount in the second chamber in preparation for the next piercing operation; and (h) pivoting the inner and outer members while in the soil, about a horizontal axis essentially perpendicular to the axis of travel of the support, so that the inner and outer members are capable of piercing holes in the soil as the support member moves horizontally over the soil.

25. The method described in claim 24 further comprising a sled which is adjustable in the vertical plane to vary the penetration depth of the inner and outer and members, said sled rotating about a horizontal axis to enable the sled to absorb any vertical forces acting thereon by transferring those vertical forces into rotational forces.

26. The method described in claim 24 further comprising an agitator block located adjacent to and above the seed or fertilizer metering system and actuated by a cam on the metering system.

27. The apparatus described in claim 24 further comprising a flexible member replacing a portion of the hollow outer member and adjacent to the dispenser, whereby the flexible material flexes outward, in the event an oversized piece of seed or fertilizer is moved by the metering system, from the first chamber to the second chamber.

* * * * *